April 12, 1932. R. MONTELEONE 1,853,874
PARACHUTE MOUNTING FOR AIRPLANES
Filed Nov. 25, 1930
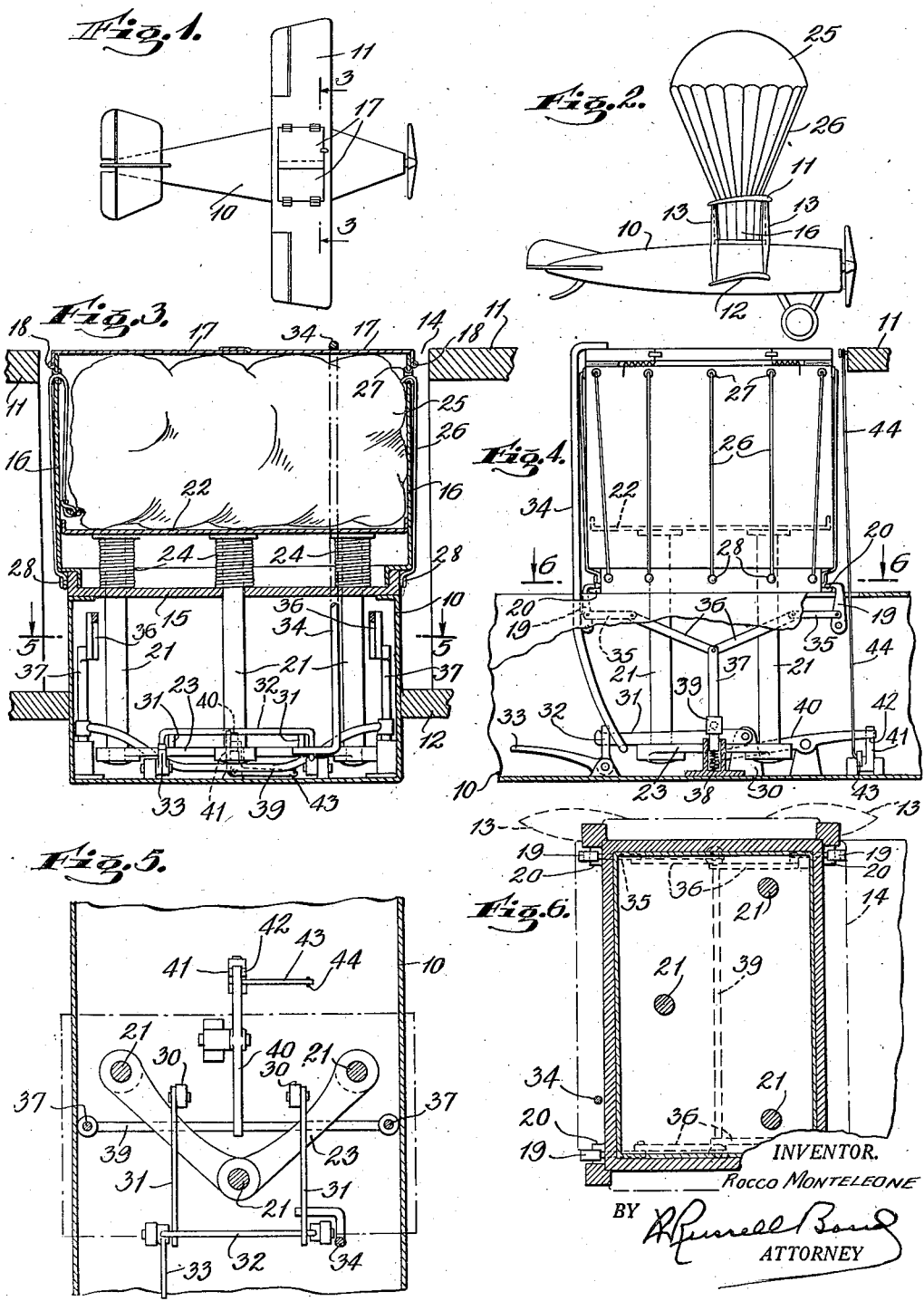
INVENTOR.
Rocco MONTELEONE
BY
ATTORNEY Patented Apr. 12, 1932

1,853,874

UNITED STATES PATENT OFFICE

ROCCO MONTELEONE, OF JERSEY CITY, NEW JERSEY

PARACHUTE MOUNTING FOR AIRPLANES

Application filed November 25, 1930. Serial No. 498,028.

My invention relates to parachutes and more particularly to devices of this type adapted to support an airplane.

I am aware that it is not new to provide a parachute capable of supporting an airplane, but an object of my invention is to provide an improved means of attachment of the parachute to the plane.

Another object is to provide a parachute support which will hold the plane on an even keel.

Another object of the invention is to provide a storage box or casing in the airplane to hold the parachute when not in use and also to provide means for positively ejecting the parachute from the casing whenever desired, so that the parachute will catch the wind and be inflated immediately.

Another object of the invention is to provide means controlled from the pilot's seat for releasing and ejecting the parachute.

In the case of certain accidents, particularly where the airplane takes fire, it is desirable for the passengers to leave the airplane and for this reason I have provided a storage box for the parachute and to which the parachute is permanently attached, said box being detachable from the airplane so as to provide a means of escape for the passengers. An advantage of this arrangement is that it provides a convenient means of detaching the parachute from the airplane should it be released and ejected from the box accidentally.

Another object of the invention is to provide means which will prevent release of the box from the airplane unless the parachute has first been ejected from the box.

With these objects in view and others which will appear hereinafter, I shall now describe a preferred embodiment of my invention and thereafter shall point out the novelty and scope of the invention in the claims.

In the accompanying drawings;

Figure 1 is a plan view of an airplane fitted with my improved parachute;

Fig. 2 is a side elevation showing an airplane supported by the parachute;

Fig. 3 is a fragmental view in section taken on the line 3—3 of Fig. 1;

Fig. 4 is a fragmental side view of the parachute casing attached to the fuselage of the airplane;

Fig. 5 is a view in section taken on the line 5—5 of Fig. 3; and

Fig. 6 is a view in section taken on the line 6—6 of Fig. 4.

In the drawings, I have used the reference numeral 10 to indicate the fuselage of a biplane, the upper wing of which is indicated by the numeral 11 and the lower wing by the numeral 12. The wings are connected by the usual struts 13. At the center of the upper wing is provided an opening 14 through which may be passed a box or casing adapted to hold the parachute. This casing comprises a bottom wall 15 which rests on the fuselage 10, and side walls 16. The top of the casing is closed by a pair of doors 17 hinged thereto as indicated at 18 and lying substantially flush with the upper surface of the wing 11. The doors are arranged to lap one over the other along their line of juncture so that both of the doors may be held shut by locking the overlapping door in closed position. The casing is held to the fuselage by means of latches 19 which are adapted to engage lugs 20 projecting from the bottom wall.

Passing through the bottom wall 15 are three vertical rods 21 which are connected at their upper ends by a head plate 22 fitted to slide in the casing. At their lower ends the rods are connected by a yoke 23. Springs 24 on the rods and bearing between the head plate and the bottom wall 15, tend to force the plate upward. In the space above the head plate when in the lowered position shown in Fig. 3, is a folded parachute 25. This parachute is connected by cords or ropes 26 to the casing. The ropes pass through grommets 27 in the side walls 16 to the exterior of the box and are led down to the bottom of the box where they are attached to bolts or other fastenings 27.

Fixed to the floor of the fuselage are bearings 30 for a pair of arms 31 which normally are passed over the yoke 23 and retained at their outer ends by a bail 32 pivotally mounted on the floor of the fuselage. The bail is formed with a pedal extension 33 located adjacent the pilot's seat so that the pilot may depress the pedal to withdraw the bail from ends of the arms 31 and permit the springs 24 to drive the head plate 22 upward.

The doors 17 are held in closed position by a vertical rod 34 which at its upper end hooks over one of the doors 17 and at its lower end hooks under one of the arms 31. Thus, on releasing the arms 31 the doors will be released and the springs 24 can then throw the parachute out of the box, flinging the doors open so that they will rest upon the upper wing. When the parachute is ejected, it is thrown up with sufficient force to carry it well above the wing so that it will catch the wind and will quickly become inflated. The airplane will then be supported by the parachute.

The parachute is not directly attached to the airplane, but is secured to the casing, which in turn is fastened to the fuselage by the latches 19. Whenever it is desired to detach the parachute from the airplane this can be done by merely spreading the latches 19.

There are four latches 19 arranged in two opposed pairs. Each pair is connected by a system of toggle links 35 and 36 to a vertical bar 37 in such manner that when the bar is raised the latches will be spread apart to release their hold on the lugs 20. The vertical bars are pressed upward by springs 38, but are normally locked against the lift of said springs. The opposite bars 37 are yoked together by means of a connecting rod 39 which is bent downward intermediate its ends so as to pass under the yoke 23. Thus, as long as the yoke is held in depressed position the latches 19 cannot be released.

An auxiliary means for holding the bars 37 in depressed position consists of a lever 40, one arm of which bears down upon the connecting rod 39, while the other is supported by a locking lever 41. The locking lever is fulcrumed to swing in a plane transverse to that of the lever 40 and is formed with a vertical arm having a notch 42 in which the adjacent end of the lever 40 is seated. The other arm 43 of the locking lever normally lies horizontally on the floor of the fuselage. By raising the horizontal arm 43 the support will be swung out from under the adjacent arm of the lever 40. Then, if the parachute has been ejected and the yoke 23 has been lifted clear of the connecting rod 39, the springs 38 will lift the bars 37, spreading all four of the latches 19 simultaneously, and releasing the parachute casing from the airplane. To permit of operating the locking lever 41 from the top of the casing a cable or tension rod 44 runs from the arm 43 to the upper wing 11.

The operation of the apparatus is as follows: Whenever it is desired to release the parachute from its casing the pilot steps upon the pedal 33, thereby withdrawing the bail 32 from the arms 31, and permitting the springs 24 to thrust the head plate 22 upward. At the same time the rod 34 is released, so that the doors 17 are flung open and the parachute is shot out of its casing. The wind catching the parachute will immediately inflate it and the plane will then be supported as shown in Fig. 2. The location of the parachute casing is such as to hold the plane on an even keel fore-and-aft, as well as laterally. If by any chance the parachute should be ejected accidentally it together with the casing may be detached from the plane by lifting the arm 43 of the locking lever. This releases the bars 37 permitting them to rise, under impulse of springs 38, and spread open the latches 19. In case of fire or whenever it is desired to abandon the airplane, the parachute is first ejected from its casing by depressing the pedal 33, after which the passengers and pilot climb up upon the top of casing sitting or standing on the head plate 22 and holding fast to the ropes 26. Then a pull on the cable 44 will cause the latches 19 to release the casing. The springs 24 provide a resilient support for the head plate 22 so as to cushion any jars that may occur on landing.

It will be observed that the casing for the parachute is located above the fuselage so that a passage thereunder is provided between the pilot's compartment and the passengers' cabin. The releasing mechanism located under the casing does not materially obstruct the passage.

While I have described a preferred embodiment of my invention it will be understood that this is to be taken as illustrative and not limitative, and that I reserve the right to make such changes in form, construction and arrangement of parts as fall within the spirit and scope of the following claims.

I claim:

1. In combination with an airplane, a casing mounted on and secured to the fuselage of the airplane, a parachute secured to the casing and normally stowed therein, rods vertically slidable through the bottom of the casing, a plunger head carried by the rods and slidable in the casing, springs on the rods urging the plunger upward, a yoke secured to the lower ends of the rods, means acting upon the yoke for holding the plunger head in lowered position, and a lever adjacent the pilot's seat in the fuselage for releasing said means.

2. In combination with an airplane, a casing mounted on the fuselage of the airplane, a parachute secured to the casing and normally stowed therein, rods vertically slidable through the bottom of the casing, a plunger head carried by the rods, springs urging the plunger upward, a yoke secured to the lower ends of the rods, retaining means acting upon the yoke for holding the plunger head in lowered position, a lever adjacent the pilot's seat in the fuselage for releasing the retaining means, means for attaching the casing to the fuselage, and releasing means for releasing the attaching means, the last named means being inoperative until the plunger has been released.

3. In combination with a bi-plane having an opening in the upper wing thereof, a casing slidable through said opening, a parachute normally stowed in the casing, spring pressed means for ejecting the parachute from the casing, means for releasing the spring pressed means, whereby the parachute will be forcibly ejected from the casing, latching means for holding the casing to the bi-plane, and means for releasing said latching means.

4. In combination with a bi-plane having an opening in the upper wing thereof, a casing slidable through said opening, a parachute normally stowed in the casing, means for releasing the spring pressed means, whereby the parachute will be forcibly ejected from the casing, latch means for holding the casing to the bi-plane, and means operable from the top of the casing for releasing the latch means.

5. In combination with a bi-plane having an opening in the upper wing thereof, a casing slidable through said opening, a parachute normally stowed in the casing, means for releasing the spring pressed means whereby the parachute will be forcibly ejected from the casing, latch means for holding the casing to the bi-plane, means operable from the top of the casing for releasing the latch means, and means for preventing release of the casing from the bi-plane until after the parachute has been ejected from the casing.

In testimony whereof, I have signed this specification.

ROCCO MONTELEONE.